A. ERKENBRECHER.
Making Starch.
No. 67,515.
Patented Aug. 6, 1867.
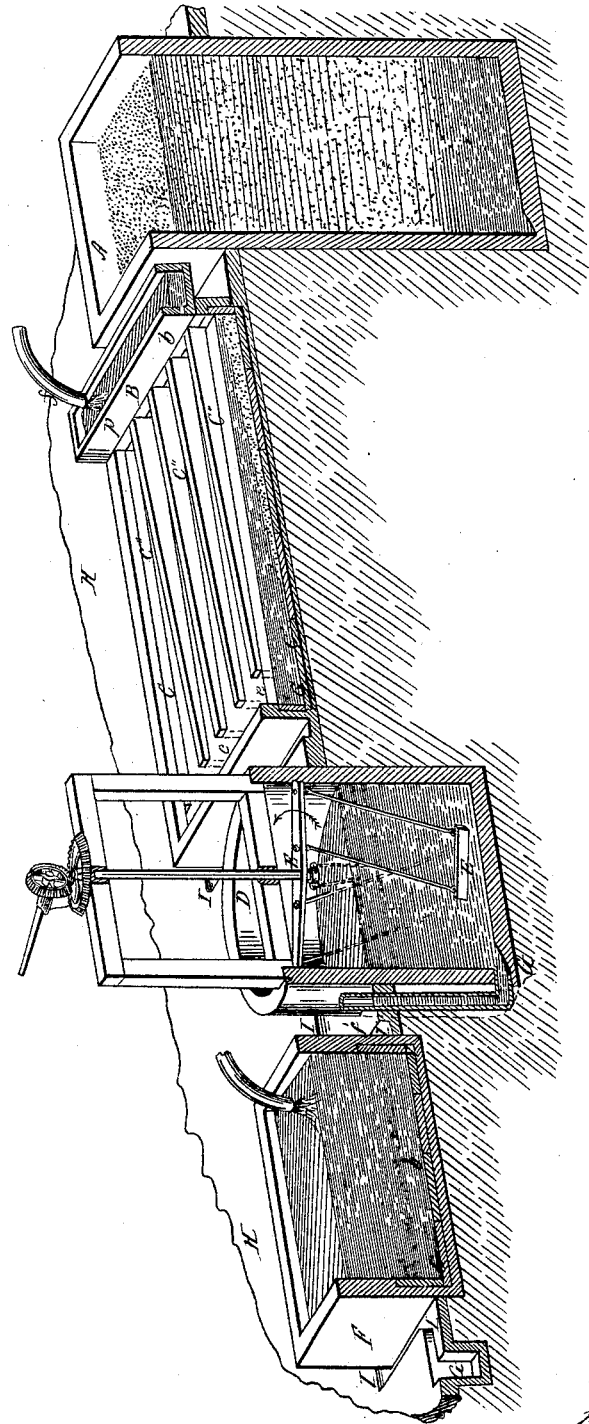
Witnesses:
James H. Layman
Samuel Knight
Inventor:
A. Erkenbrecher
By Knight Bro's
Att'ys

United States Patent Office.

ANDREW ERKENBRECHER, OF CINCINNATI, OHIO.

Letters Patent No. 67,515, dated August 6, 1867.

---

IMPROVED STARCH-MAKING APPARATUS.

---

*The Schedule referred to in these Letters Patent and making part of the same.*

---

TO WHOM IT MAY CONCERN:

Be it known that I, ANDREW ERKENBRECHER, of Cincinnati, Hamilton county, Ohio, have invented a new and useful improvement in Starch Factories; and I hereby declare the following to be a full, clear, and exact description thereof, reference being had to the accompanying drawings, making part of this specification.

The manufacture of starch in this country and Europe as heretofore conducted has been carried on by the use of fermenting-tubs for the grains used, built of wood, either square or round, and located anywhere, from a cellar floor upward, through a house for that purpose, and, no matter how situated or placed, always causing the gases and obnoxious vapors to become distributed all over an establishment, and thereby causing a corrosion of timber and metals, and fermentation of the amylaceous matters, and these evils are greatly aggravated by the impossibility of maintaining underneath such tubs or vats the cleanliness required for the successful manufacture of starch, because the entering of the acids (generated by the fermentation) into the pores of any woods cannot be prevented, and being only imperfectly checked by frequent neutralization with alkalies; and further, such acids and ferment, having fully impregnated the woods all over a building, will prevent successful operation during the summer months, and during weather when the atmosphere is highly charged with electricity, and have made that branch of industry in cities and neighborhoods a nuisance.

The ways or separating runs located on any floor, and built of any kind of wood flooring, are subject to the above objections, and, additionally, to a vast amount of leakage and waste. The stirring-tub or vat of wood used as a depository of starch, from the ways in which the starch by mechanical contrivance is liquidized for final distributing in frames, is also subject to above-cited defects, and liable to constant wear and tear by the machinery operating it. The distributing-frames of wood of various sizes, from two and a half to sixteen feet, and two and a half feet high, of which many are necessary, are placed on cellar floors, with their bottoms from one to three inches above ground, and thereby cannot be kept clean underneath, nor the ferment prevented from entering the pores of the wood. Cellars or other apartments where the process of starch manufacture is carried on are floored or planked, and always susceptible of becoming reservoirs for decomposed vegetable matter, and an abode for rats and other vermin. In short, the ordinary process of manufacturing starch is well known to be in the highest degree insalubrious and offensive, owing in a great measure to the exclusive use of wooden vessels, which, in order to avoid speedy rotting, are necessarily placed above the ground. The process is unavoidably humid, and the liquor separated in the various steps of the operation, being highly charged with acetic and other acids, and with azotized compounds, putrefies and rots the wood, and engenders a rampant growth of mould and fungus, and reacting on the starch causes a rapid and destructive fermentation and loss of the amylaceous particles; moreover, the slime and slop seeping through the joints and fissures of the numerous vats, tanks, and cisterns or "frames," carry off and waste the starch, and greatly aggravate the amount of putrefactive agencies. The floor also being of wood is itself an abundant cause of putrefaction. Indeed the entire atmosphere within and for a considerable distance outside of a starch factory, is ladened with the germs and emanations of decay.

It is the aim of my improvement, not alone to save the enormous loss and waste of material, but to render a starch factory pure and salubrious by, first, replacing the common wooden frames, vats, &c., with tanks and cisterns sunk in the ground or in a bed of masonry, and composed wholly of cement and stone, forming a permanent part of the building; second, in place of the common wooden floor, using one of cement, artificial stone, asphaltum, stone, or marble, with suitable gutters to collect and to conduct off into appropriate receptacles all the starch spilled over in the various operations; third, instead of the customary laborious manipulations of stirring, carrying, &c., employ mechanical means for almost every operation of the factory.

I also employ, but desire to make the subjects of separate patents, a rotating agitator of peculiar construction in place of the comparatively slow and laborious use of oars or paddles; a peculiar arrangement of tracks, steam-heating pipes, trucks, and ventilators, by which I am enabled to effect the drying operations with great speed and accuracy, and without injury to the starch; a system of ventilating-pumps, fans, or chimneys and passages for the speedy and effectual removal of the carbonic acid and other deleterious emanations, so as to keep the whole establishment pure and sweet, and preserve the health of the operatives, and prevent the waste and decay both of the manufactured article and of the containing vessels, &c.

The accompanying drawing is a sectionized perspective view of the vessels used in the various processes of fermentation, precipitation, agitation, and distribution, one of each kind only being shown.

In place of the customary wooden fermenting-vats, I employ a capacious tank, A, of masonry, lined with hydraulic cement, and embedded for the most part of its depth in the ground, chiefly for the preservation of a uniform temperature, but also to avoid any harbor underneath it for mould, and to afford convenient access and effective support of the sides against hydrostatic pressure. From the tank A the fermented grain is pumped or otherwise elevated to the grinding-mills and bolts or separators, which may be of the usual form. From the bolts the milky fluid is conducted into a trough, B, from which it trickles through perforations, b, into ways and runs C, which discharge into a common gutter, c. The said trough, ways, and gutter rest upon the ground or upon a bed of masonry, so as to secure an even temperature and avoid harbor for corruption, vermin, &c., as before stated, and their bottoms C' and sides C'' are formed of slabs of stone or marble, secured in hydraulic cement, or of artificial stone cement or asphaltum. A great source of leakage, waste, and corruption is thus abolished. The supernatant liquor having been allowed to pass off from the ways the starch is easily removed from the hard and smooth floors of the ways, and is thrown into the stirring-vat or liquidizer D, which vat is likewise of cemented masonry, and embedded for the greater part of its depth in the ground. In place of the usual tedious and laborious hand stirring, I employ a mechanical agitator, E, which, being designed for the subject of a distinct patent, need not be specifically described. Instead of the customary numerous wooden "frames," so liable to sour and to give out, I employ one or more capacious cisterns, F, having a floor, f, and sur-base, f', of stone or marble, and walls of cemented brick-work or masonry. In this cistern the starch is allowed to settle, and from it (after the elutriation of the slop and slime) the starch, in semi-liquid condition, is removed by scoops into the moulds. The stone or marble floor and surface of the cistern are greatly preferable over the wood in various respects. Being impervious and non-organic, they are wholly impregnable to the action of the acids and other solvents elaborated in the starch liquor. It also affords a smooth and hard surface that is not liable to be scraped up by the action of the scoops. It can be washed out perfectly clean, and without retaining any particles liable to fermentation, and the original cost of a full set of such cisterns is only from one-half to one-third of the customary wooden vats and frames. The floor of each vessel is made sloping toward a sink or basin, G, at one side or corner, for ready and complete cleansing. My system of capacious, cleanly, and economical vessels of stone, marble, or cement, is completed by making the floor H itself of one or other of these materials, and providing suitable gutters I, terminating in sinks G', for the conduction and preservation of the amylaceous matters that may be spilled upon it in the various stages of the operation. Thus the entire factory is in effect one large cistern.

I claim herein as new, and of my invention—

1. A starch-making establishment or factory whose containing vessels and floor are composed wholly or chiefly of cement or masonry, having suitable ducts, gutters, &c., and being formed and arranged substantially as and for the purpose set forth.

2. Constructing the various receptacles, &c., of a starch factory of stone, marble, or cement, or any two or more of these combined, substantially as and for the purpose herein described and explained.

In testimony of which invention I hereunto set my hand.

ANDREW ERKENBRECHER.

Witnesses:
GEO. H. KNIGHT,
JAMES H. LAYMAN.